United States Patent [19]

Kosonocky

[11] 3,890,633

[45] June 17, 1975

[54] CHARGE-COUPLED CIRCUITS

[75] Inventor: Walter Frank Kosonocky, Skillman, N.J.

[73] Assignee: RCA Corporation, New York, N.Y.

[22] Filed: Apr. 6, 1971

[21] Appl. No.: 131,679

[52] U.S. Cl. .............. 357/24; 307/221 D; 307/304; 357/30; 357/59

[51] Int. Cl. .............................................. H01l 17/00

[58] Field of Search .................... 317/275 B, 275 G; 307/221 C, 307, 221 D, 311; 357/24, 30

[56] References Cited

UNITED STATES PATENTS

| | | | |
|---|---|---|---|
| 3,621,283 | 11/1971 | Teer | 317/235 |
| 3,651,349 | 3/1972 | Kahng et al. | 317/235 |
| 3,654,499 | 4/1972 | Smith | 317/235 |
| 3,683,193 | 8/1972 | Weimer | 317/235 |

FOREIGN PATENTS OR APPLICATIONS

| | | | |
|---|---|---|---|
| 2,105,252 | 9/1970 | France | 317/235 |

OTHER PUBLICATIONS

*Electronic Design*, "New Surface-Charge Transistor Has High Data Storage Potential," Dec. 20, 1970, page 28.

*Electronics*, "New MOS Technique Points Way To Junctionless Devices" May 11, 1970, pages 112–118.

*Primary Examiner*—Michael J. Lynch
*Assistant Examiner*—William D. Larkins
*Attorney, Agent, or Firm*—H. Christoffersen; S. Cohen

[57] ABSTRACT

In a circuit such as a charge-coupled, light-sensing array, every third charge storage electrode is maintained at a direct voltage level. Charge is shifted between such electrodes by two voltage phases, each varying in amplitude from a level lower than to a level greater than said direct voltage level, applied to two intervening charge storage electrodes, respectively.

10 Claims, 14 Drawing Figures

INVENTOR.
Walter F. Kosonocky
BY
ATTORNEY

INVENTOR.
Walter F. Kosonocky
BY
[signature]
ATTORNEY

INVENTOR.
Walter F. Kosonocky
BY
ATTORNEY

INVENTOR.
Walter F. Kosonocky
BY
Samuel Cohen
ATTORNEY

INVENTOR.
Walter F. Kosonocky
BY
ATTORNEY

INVENTOR.
Walter F. Kosonocky
BY
ATTORNEY

INVENTOR.
Walter F. Kosonocky
BY
ATTORNEY

INVENTOR.
Walter F. Kosonocky
BY Samuel Cohen
ATTORNEY

CHARGE-COUPLED CIRCUITS

STATEMENT

The invention described herein was made in the course of or under a contract or subcontract thereunder with the Department of the Air Force.

BACKGROUND OF THE INVENTION

A group of papers delivered at the International Solid State Circuits Conference in February 1971, summaries of which appear beginning on page 158 of the conference proceedings, describe charge-coupled devices. In such devices minority carrier charges are stored in potential wells created at the surface of a common semiconductor substrate and voltages are employed to move the charges along this surface.

SUMMARY OF THE INVENTION

The present application describes both image sensing arrays and shift register arrays formed of charge-coupled devices. A feature of a number of embodiments of the invention is the way in which the charges are propagated. Certain of the electrodes are continuously maintained at a direct voltage level and other of the electrodes are driven by two voltage phases. Operating in this way permits high packing density to be achieved and permits the use of either high or low resistivity substrates.

DETAILED DESCRIPTION

Figure 1:
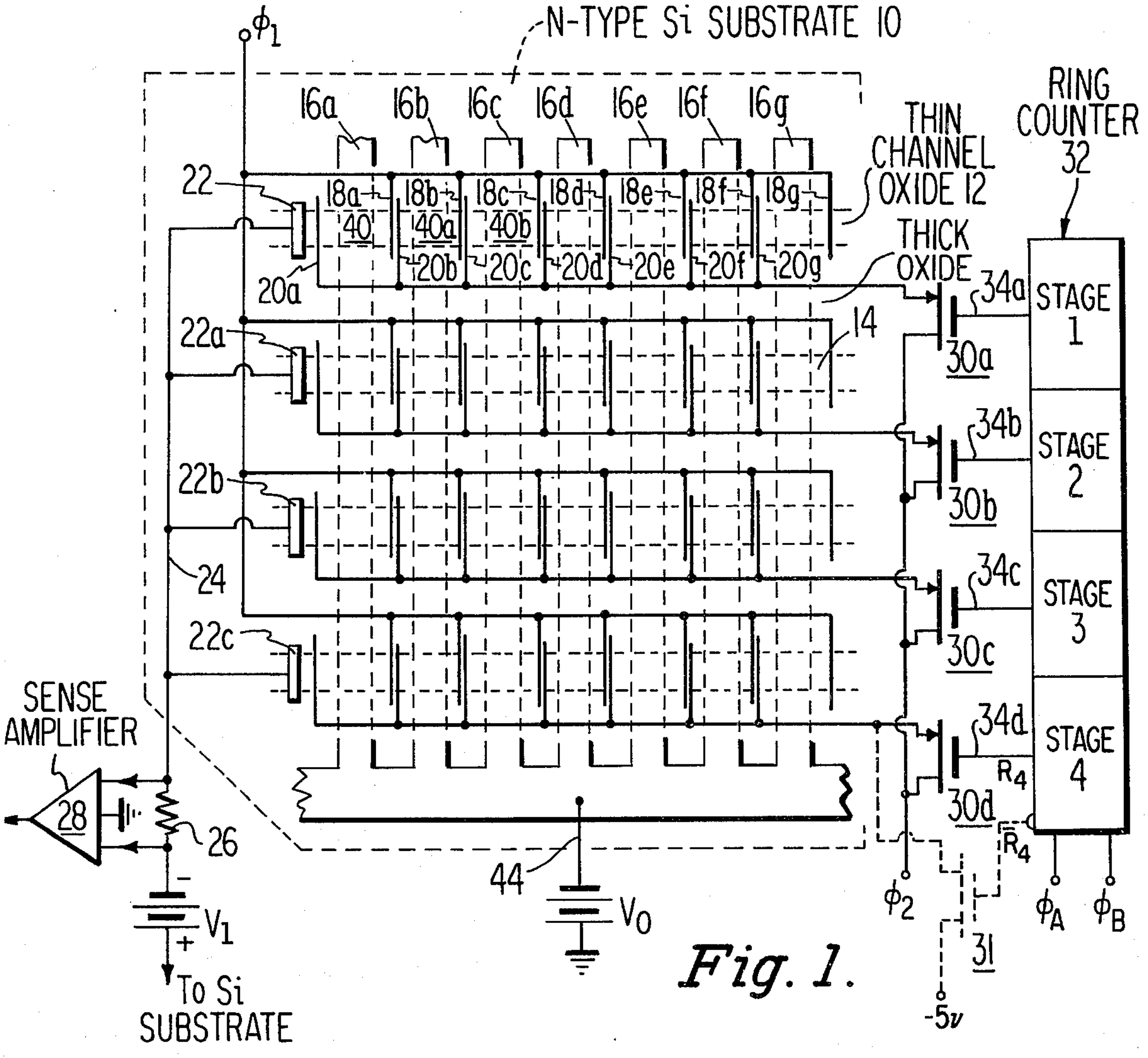
FIG. 1 is a schematic showing of an image sensing array according to an embodiment of the invention.
Figure 2:
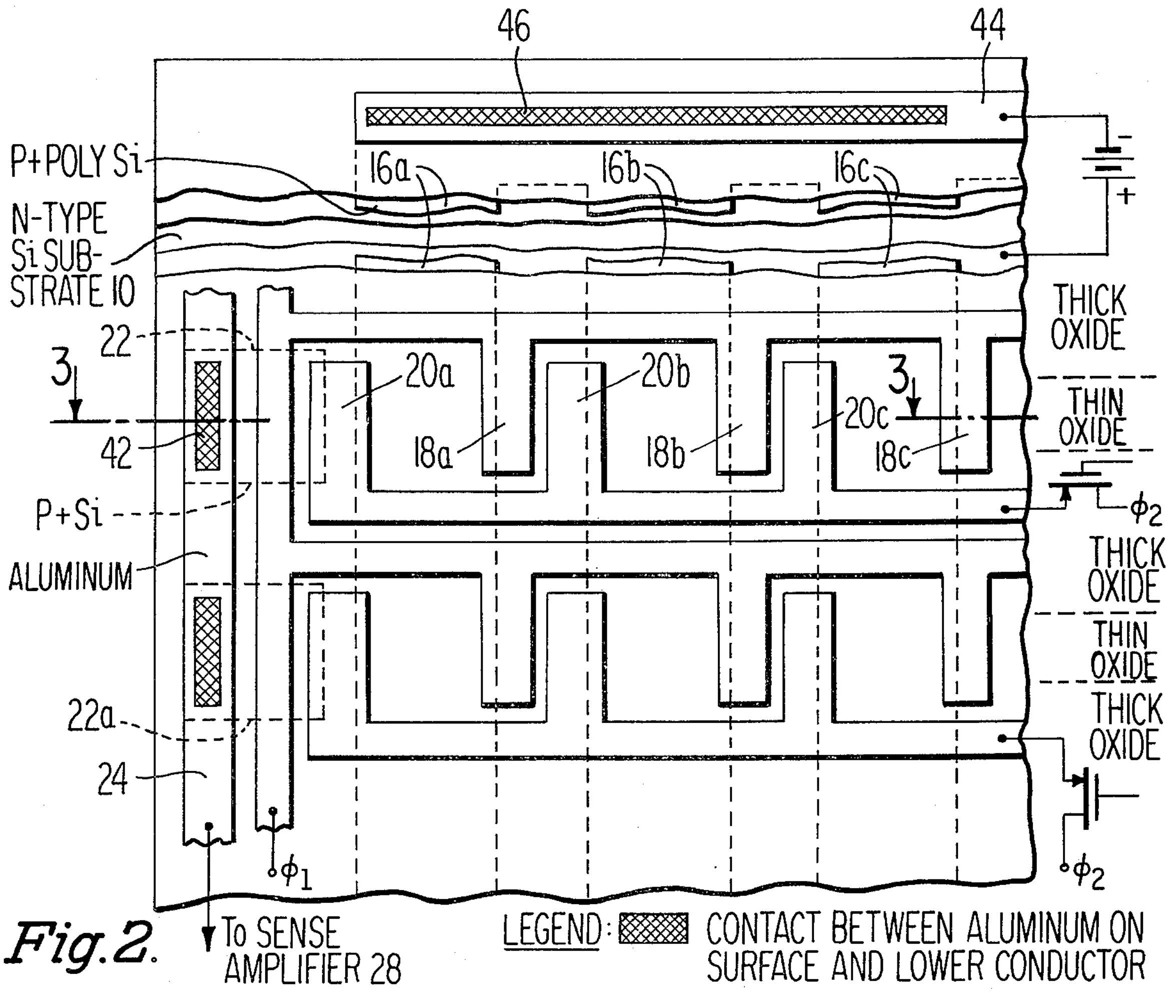
FIG. 2 is a plan view of a portion of an array such as shown in FIG. 1.
Figure 3:
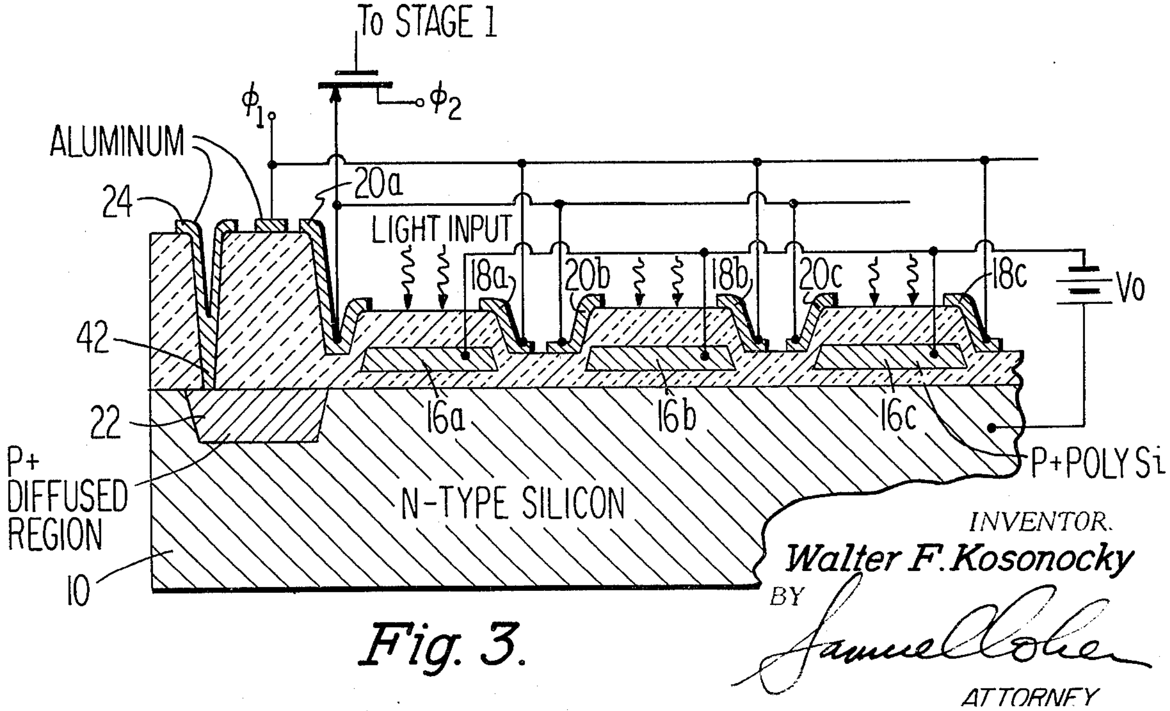
FIG. 3 is a cross section taken along line 3—3 of FIG. 2.

FIG. 1 shows in highly schematic fashion an embodiment of a charge-coupled, light-sensing array employing the invention. FIGS. 2 and 3 show the structure more realistically. The array includes a common substrate such as one formed of n-type silicon. This is shown by dashed line at 10 in FIG. 1. An insulating layer such as one formed of silicon dioxide is located over the substrate 10. In certain regions such as 12, 14 and so on, the silicon dioxide is relatively thin — of the order of 1,000 Angstroms thick and in the regions between these thin oxide channels, the silicon dioxide is relatively thick — of the order of 10,000 A or more thick.

A plurality of polysilicon electrodes 16*a*, 16*b* and so on are located over the insulation. In the thin channel oxide regions, these electrodes are relatively close to the substrate — 1,000 A or so, and in the thick channel oxide regions they are relatively far from the substrate — 10,000 A or more. The polysilicon electrodes are parallel to one another and are all connected to a common direct voltage level $V_O$, such as −10 volts. The polysilicon electrodes are covered with an $SiO_2$ insulation layer, perhaps 1,000 to 4,000 A thick.

The groups of interleaving aluminum electrodes are also located over the insulation layer at each thin channel oxide region. These electrodes are shown in detail in FIGS. 2 and 3 and in highly schematic fashion in FIG. 1. For the first thin channel oxide region 12, one group of electrodes is shown at 18*a*, 18*b* and so on, and the other group of electrodes is shown at 20*a*, 20*b* and so on. An electrode such as 18*a* overlaps the polysilicon electrode 16*a;* an electrode such as 20*b* overlaps the polysilicon electrode 16*b;* and so on. This is shown more clearly in FIGS. 2 and 3. The end electrode 20*a* overlaps the polysilicon electrode 16*a* and a charge collecting or "drain" region 22. The latter is a *p*+ silicon region located in the n-type silicon substrate and formed by diffusing p-type impurities through a mask into the substrate. The actual structure of the drain region 22 is shown most clearly in FIGS. 2 and 3.

The various charge collecting drains 22, 22*a* . . . 22*c* are connected via a common output lead 24, through a current sensing resistor 26, to a negative voltage source $V_1$ which provides a voltage such as −20 volts. The positive terminal of this source may be connected to the substrate. A sense amplifier 28 is connected across this resistor for producing an output voltage indicative of the charge collected by a drain such as 22, as will be discussed in more detail shortly.

One set of electrodes for each row of the light sensing array is driven by the first phase $\phi_1$ of the two-phase voltage supply. For example, the electrodes 18 of the first row are driven by $\phi_1$. Each second set of electrodes, such as 20, is connected to the source electrode of a different metal-oxide semiconductor (MOS) transistor transmission gate. Thus, the electrodes 20 of the first row are connected to the source electrode of transistor 30*a;* the corresponding electrodes of the second row are connected to the source electrode of MOS transistor 30*b;* and so on. The purpose of the transmission gates 30*a*, 30*b* . . . 30*d* is to route the $\phi_2$ voltage to the row being scanned, as discussed shortly.

The source electrodes of the transmission gates normally are at −5 volts. There are a number of ways this may be accomplished. One is to depend on the distributed capacitance present at the source electrodes. Each transistor such as 30*a*, is turned off by the ring counter 32 when $\phi_2$ is at −5 volts by proper phasing of $\phi_2$ relative to the $\phi_A$ and $\phi_B$ voltages employed to step the ring counter. The distributed capacitance at the source electrode then remains charged to this same value, −5 volts, at least until the next scan interval for that row. As a second alternative, each source electrode may be connected through another transmission gate to a −5 volt source, this other transmission gate being controlled by the complement of the ring counter output signal for that row. Such an arrangement is illustrated in phantom view at 31*d* for row 4. The other rows would include similar structure.

The drain electrodes of the transmission gates 30*a*, 30*b* . . . 30*d* are connected to the second phase $\phi_2$ of the two-phase voltage source. The phase relationship between $\phi_1$ and $\phi_2$ is shown at the right in the lower two waveforms of FIG. 4.

The gate electrodes of the MOS transistors 30 are connected to separate stages of a ring counter 32. For example, gate electrode 34*a* is connected to stage 1 of the counter; gate electrode 34*b* is connected to stage 2 of the counter, and so on. This ring counter applies a negative voltage to one of the transistors 30 and a positive voltage to all other of the transistors 30. Thus, it causes one of the MOS transistors to turn on and all other of the MOS transistors to be off. As already mentioned, the ring counter is driven by a two-phase voltage source which produces the voltages $\phi_A$ and $\phi_B$.

In the operation of the array of FIG. 1, the image of a scene may be projected onto the upper surface of the array. The light causes each location of the array to store a charge proportional to the amount of light reaching that location. For example, at the upper left of the array at location 40, a charge will accumulate in the potential well in the substrate beneath polysilicon electrode 16*a*, which charge is proportional to the amount of light passing through the transparent silicon dioxide layer and through the relatively transparent polysilicon electrode to the silicon substrate. To insure that sufficient light reaches the substrate, the polysilicon electrodes should be relatively thin — from 1,000 to 2,000 A. The light absorbed by the substrate causes electron-hole pairs to be generated and the holes are collected at the potential wells beneath the polysilicon electrodes, such as 40. Each other memory location such as 40*a*, 40*b* and so on also will accumulate charge proportional to the amount of light reaching it. The time required for the charge to accumulate may be roughly one frame time.

The charge stored in the light sensing array may be read out in the following way. To start with, the ring counter 32 may turn on the MOS transistor 30*a* for the first row. All other transistors 30*b*, 30*c* and 30*d* will be off. The phase 2 voltage $\phi_2$ is now applied to the electrodes 20 of row 1 and the phase 1 voltage is applied to the electrodes 18 of row 1. In a manner to be discussed in more detail shortly, these two voltage phases cause the charges accumulated under the polysilicon electrodes in the first row to be propagated to the left.

When each charge reaches the last location 40, the $\phi_2$ voltage applied to the last electrode 20*a* causes charge to transfer from the potential well at 40 to the charge collecting drain 22. The current thereby produced is sensed by sense amplifier 28. The latter produces an output signal proportional to the amount of current flow and this, in turn, is proportional to the amount of light reaching a particular location. Thus, in response to successive cycles of the two phase voltage $\phi_1$, $\phi_2$, successive signals are produced at sense amplifier 28 indicative of the charge stored in row 1 and these, in turn, are indicative of the light image projected onto row 1.

During the read-out of information, light continues to illuminate the array and new charges begin to form. However, the charge accumulation is relatively slow — requires about one frame time, which is many many times longer than the row read-out time. In commercial television, for example, the frame time is more than 500 times the line scan time. Accordingly, the amount of charge accumulating in a row in response to the light pattern received at that row during the read-out of the row, is relatively small and has essentially no effect on the information being read-out.

After row 1 of the array has been read out, the $\phi_A$–100 $_B$ power supply voltage causes the ring counter to advance by one. This causes MOS transistor 30*b* to be turned on and all other transistors 34*a*, 34*c* and 34*d* to be turned off. Now the second row is read out in a manner similar to that discussed above for row 1. This process continues until the entire array has been read out.

In the case in which a row is not selected for readout, there are still charges stored at that row. As will be discussed next, any charge stored at a non-selected location is shifted back and forth between that location and a potential well beneath an aluminum electrode adjacent to that location. This shift in charge position occurs in response to each change in value of $\phi_1$. The charge moves first to the left then to the right and back to the left and so on as will be shown shortly. The charge does not propagate down toward the charge collecting drain 22 for that row until the phase 2 voltage $\phi_2$ is applied to that row.

The plan view of FIG. 2 and the cross section of FIG. 3 show in more detail the structure of the array of FIG. 1. The $\phi_1$ *and* $\phi_2$ electrodes are formed of aluminum. An electrode such as 18*a*, for example, is an aluminum electrode which overlaps the polysilicon electrode 16*a*, being spaced therefrom say 1,000 A, and is also capacitively coupled to the n-type silicon substrate. The space between electrode 18*a* and the substrate may be say from 1,000 to 3,000 A. As already mentioned, the polysilicon electrodes preferably are relatively thin — dimension *d* in FIG. 3 may be 1,000 to 2,000 A. At this thickness, the polysilicon is quite transparent to red and near infra-red light and is also reasonably transparent to other light over a relatively broad spectral range.

As is seen most clearly in FIG. 2, the various aluminum electrodes may be connected to conductors beneath them by placing them in actual contact with the electrodes beneath them. For example, aluminum conductor 24 is connected to the charge collecting drain 22 at 42. The region 42 is also shown in FIG. 3. Similarly, the common conductor 44 is connected to all of the polysilicon electrodes by the direct connection at 46.

Figure 4:
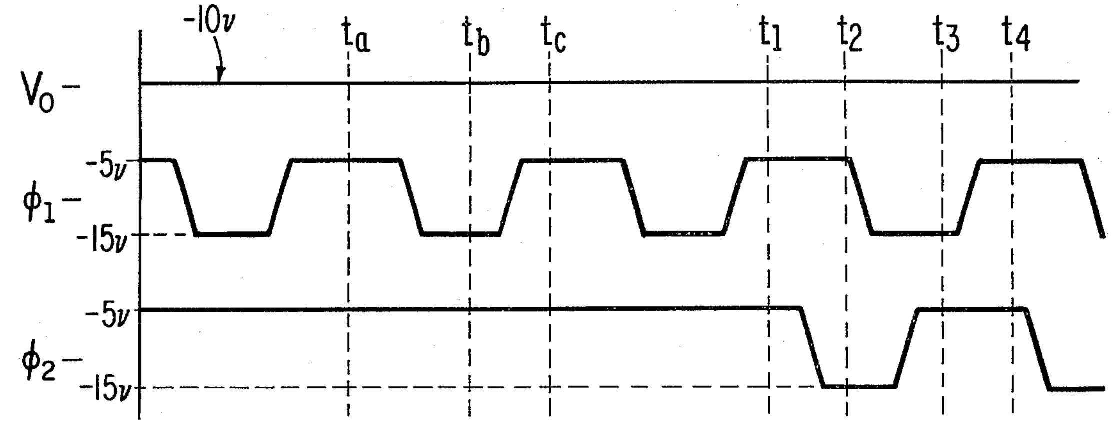
FIG. 4 is a drawing of waveforms employed in the operation of the circuit of FIGS. 1–3.
Figure 5:
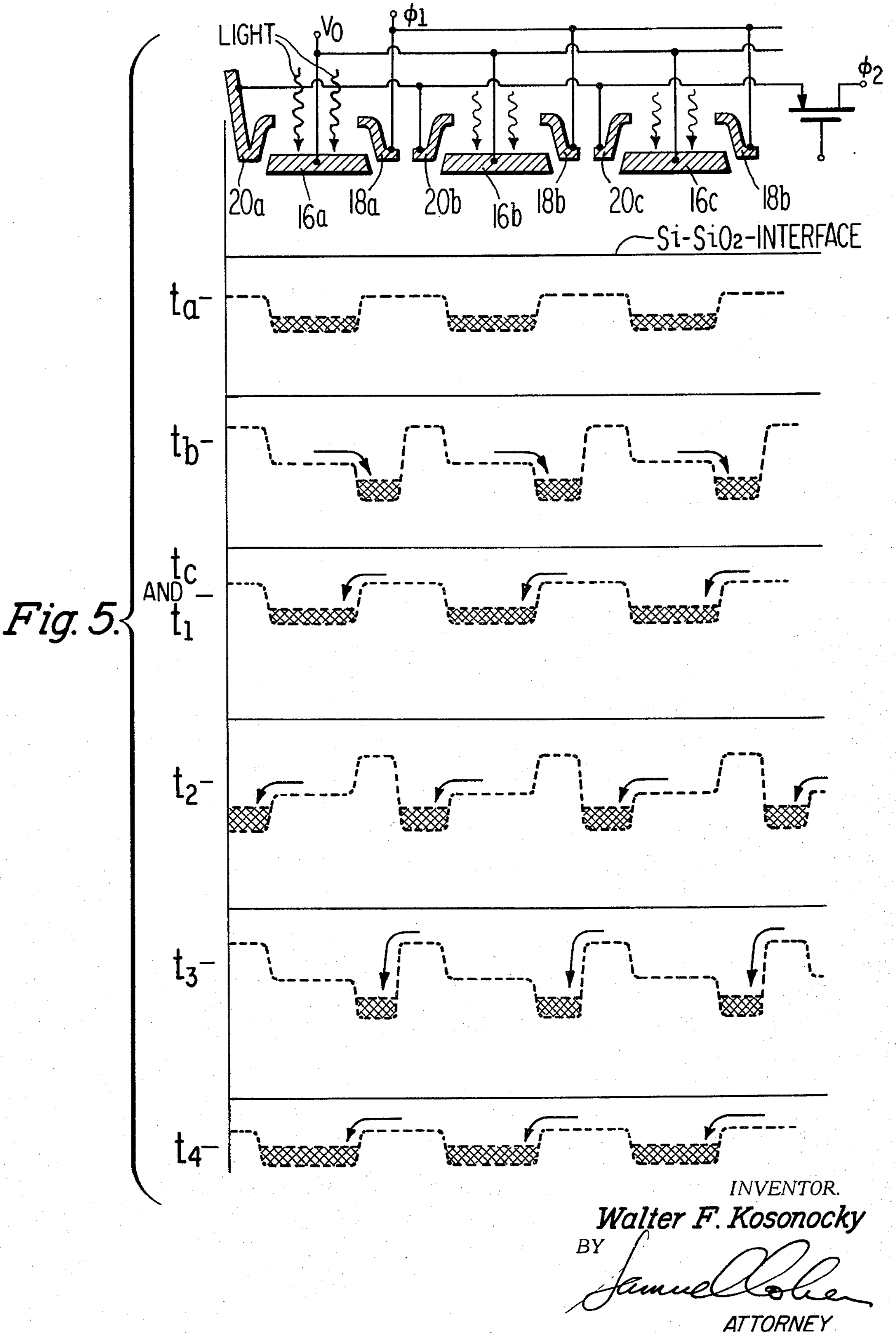
FIG. 5 is a drawing of the potential wells formed in response to the waveforms of FIG. 4.

The method by which charges propagate is shown in FIG. 5. A typical electrode structure, actually the structure of a part of row 1, is shown at the upper part of the figure. Beneath this, each horizontal line represents the interface between the channel oxide ($SiO_2$) and the silicon substrate. The potential wells are shown by dashed lines and the charges, which actually accumulate at the surface of the silicon substrate, are illustrated schematically by cross hatching within the well, to represent the reduction in the potential at the substrate surface. The voltage levels applied to the various electrodes are shown in FIG. 4.

To start with, assume that the row shown has not been selected. This means that phase 2 ($\phi_2$) remains at a steady value of −5 volts as already discussed. At time $t_1$, the $\phi_1$ voltage is at −5 volts and $V_0$, which is a direct voltage level, is at −10 volts. Potential wells, which are deepest beneath the polysilicon electrodes 16*a*, 16*b* and so on, appear beneath these electrodes. In response to light excitation, minority carriers-positive charges, have accumulated in each such potential well. The amount of charge in each case will be proportional to the intensity of the light striking the corresponding polysilicon electrode at that particular location.

At time $t_b$, the $\phi_1$ voltage has changed in value to −15 volts. This means that the potential well beneath electrodes 18*a*, 18*b* and 18*c* become substantially deeper than the potential wells beneath the electrodes 16*a*, 16*b* and 16*c* to which they are coupled. Accordingly, the positive charge stored, for example, at 16*a*, flows out of the potential well beneath 16*a* and into the deeper potential well beneath 18*a*. The flow of charge, in each case, is to the right as shown at $t_b$ in FIG. 5.

At time $t_c$, the $\phi_1$ voltage has returned to −5 volts. This means that the potential wells beneath electrodes 18 become shallower than the potential wells beneath their corresponding electrodes 16. Accordingly, charge formerly present beneath electrodes 18 flows back to the potential wells beneath their corresponding electrodes 16. This process continues for the entire time that any row is not selected, which is the major part of each frame time. In other words, for the major part of each frame, the charge accumulates beneath the polysilicon electrodes and shuttles back and forth between each polysilicon silicon electrode 16 and its associated aluminum electrode 18. The aluminum electrodes 20 during this entire period are maintained at −5 volts and therefore the potential wells beneath electrodes 20 act as a barrier and never become sufficiently deep to accumulate any substantial charge.

Assume now that a row has been selected. At time $t_1$, the situation is as depicted by the third waveforms of FIG. 5. Charge has accumulated beneath the various polysilicon electrodes 16 proportional to the intensity of light reaching the respective electrodes.

At time $t_2$, the electrodes 20 become negative to the extent of −15 volts. Charge therefore flows from the respective potential wells beneath electrodes 16 to the left and into the deeper potential wells at 20. The same thing is illustrated as occurring at the first aluminum electrode 20*a;* however, this is a special case. Here, the −15 volts forms a relatively deep potential well to the left of electrode 16*a* and results in the transfer of charge from the well beneath 16*a* to the drain 22 (see FIG. 3) which may be at a negative potential $V_1$ such as −20 volts — a voltage somewhat more negative than the voltage of electrode 20*a*.

Returning now to FIGS. 4 and 5, at time $t_3$, the $\phi_1$ voltage is negative to the extent of −15 volts and $\phi_2$ is negative to the extent of −5 volts. Now the potential wells are deepest beneath electrodes 18 and charge formerly present beneath electrodes 20 flow to the left into these deeper wells. Note that the waveforms are such that the electrodes 18 reach −15 volts while electrodes 20 are still at −15 volts so that there is no tendency for charge formerly present under electrodes 20 to flow back to the right toward the shallower potential wells beneath electrodes 16.

At time $t_4$, the electrodes 18 have returned to −5 volts and the electrodes 20 are also at −5 volts. Accordingly, the deepest potential wells present are beneath electrodes 16 so charge formerly present beneath electrodes 18 flows to the left and into the potential wells beneath electrodes 16. Thus, it has been shown that when a row is selected, charge propagates from electrode to electrode to the left until it eventually reaches the charge collecting electrode 22 at the end of the row.

Figure 6:
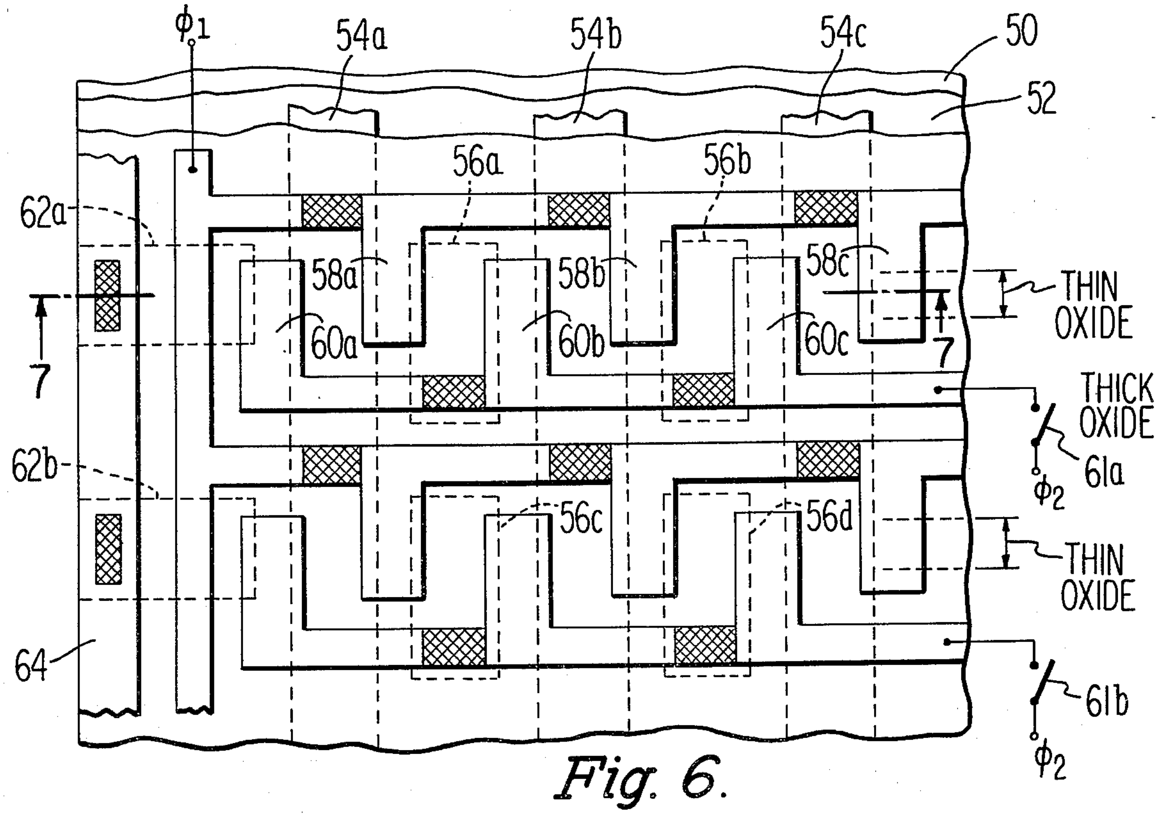
FIG. 6 is a plan view of a portion of a twophase operated embodiment of a light sensing array employing the invention.
Figure 7:
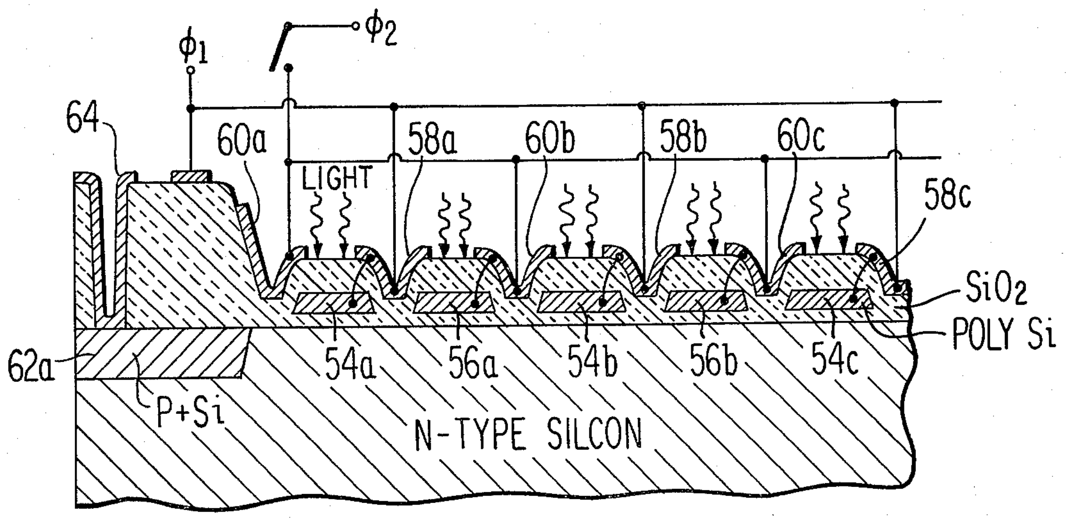
FIG. 7 is a section taken along line 7—7 of FIG. 6.

A form of the invention suitable for "straight" two-phase operation is illustrated in FIGS. 6 and 7. The ring counter arrangement is similar to that of FIG. 1 and is not shown. The system includes a common n-type silicon substrate 50 with a silicon dioxide layer 52 over the substrate. As in the case of the previous arrangement, there are thick and thin silicon dioxide channels, the light sensing locations occurring at the polysilicon electrodes over the thin oxide channels.

There are a plurality of polysilicon electrodes 54*a*, 54*b* and 54*c* which extend the entire length of each column. These are other polysilicon electrodes 56*a*, 56*b*, 56*c* and so on which are individual to particular light sensing locations. Aluminum electrodes lie over the top surface. Each row of the photosensor array includes a first group such as 58*a*, 58*b*, 58*c* of electrodes powered by the first voltage phase $\phi_1$ and a second group of electrodes 60*a*, 60*b*, 60*c*, interleaved with the first group, powered by the second voltage phase $\phi_2$ when the switch for that row is closed. Two such switches are shown at 61*a* and 61*b*, respectively. In practice, these switches may be electronic switches such as the MOS transistors of FIG. 1 and may be driven by a ring counter, also as in FIG. 1.

The $\phi_1$ aluminum electrodes are connected to the polysilicon electrodes 54*a*, 54*b* and so on and the $\phi_2$ aluminum electrodes are connected to the individual polysilicon electrodes of the respective rows. Thus, the $\phi_2$ electrodes 60*a*, 60*b* and 60*c* for the first row are connected to the polysilicon electrodes 56*a* and 56*b*. The $\phi_2$ electrodes for the second row are connected to the polysilicon electrodes 56*c* and 56*d*. Each aluminum electrode is spaced further from the substrate than its corresponding polysilicon electrode. For example, polysilicon electrode 54*a* may be 1,000 A from the substrate and aluminum electrode 58*a* 3,000 A from the substrate. There is also a charge collecting region, such as shown at 62*a* and 62*b*, at the end of each row. These regions 62 are connected to a common aluminum line 64 which leads to a sense amplifier (not shown).

Figure 8:
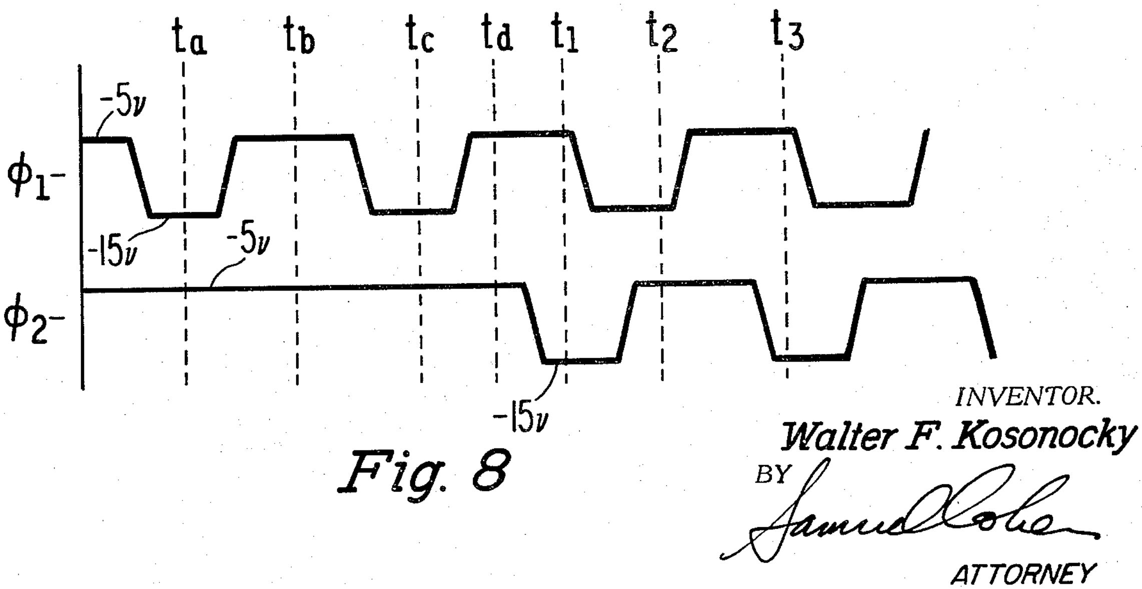
FIG. 8 is a drawing of waveforms employed in the operation of the circuit of FIGS. 6 and 7.
Figure 9:
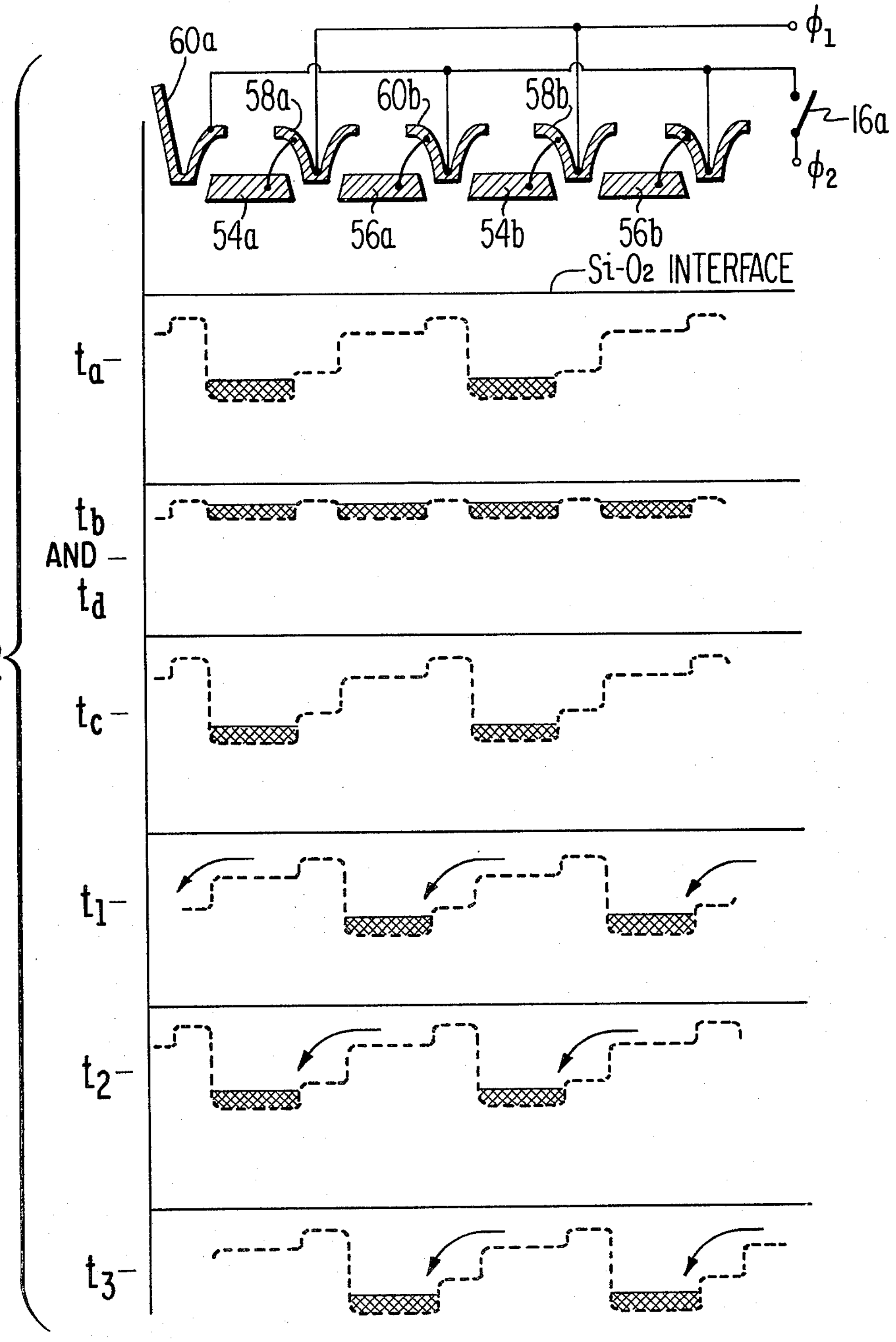
FIG. 9 shows in schematic fashion the potential wells formed in response to the waveforms of FIG. 8.

The operation of the system of FIGS. 6 and 7 may more easily be understood with reference to the waveforms of FIG. 8 and the potential wells shown in FIG. 9. Times $t_a$, $t_b$, $t_c$ and $t_d$ represent times when a row simply is storing charge. During these times, the switch 61*a* at the end of the row is open so that the $\phi_2$ voltage remains constant at −5 volts.

At time $t_a$ an asymmetrical potential well forms beneath each composite $\phi_1$ electrode. For example, at composite $\phi_1$ electrode 54*a*, 58*a* the potential well is relatively deep beneath the polysilicon electrode 54*a* and somewhat shallower beneath the aluminum electrode 58*a*. The potential well beneath the $\phi_2$ electrodes also is asymmetrical but is shallower than the potential well beneath the $\phi_1$ electrodes. Light striking the polysilicon electrodes 54*a*, 54*b* and so on cause charges to accumulate at the potential wells beneath these electrodes, as shown.

At time $t_b$, both the $\phi_1$ and $\phi_2$ electrodes are at −5 volts. This means that all of the potential wells become relatively shallower. However, in view of the asymmetrical nature of the potential wells, the charge stored cannot escape. For example, the charge stored in the well beneath polysilicon electrode 54*a* cannot move either to the right or to the left because of the relatively shallower potential wells beneath aluminum electrodes 60*a* and 58*a*.

At time $t_c$, the situation is similar to that at time $t_a$ and at time $t_d$ the situation is similar to that at time $t_b$. So long as a row is not selected, the charges which accumulate simply remain stored in a potential well which changes in depth each half cycle of $\phi_1$, as shown. The charge does not move to the left toward the charge collecting region such as 62*a* of FIGS. 6 and 7.

Assume now that the switch 61*a* closes selecting the row shown for readout. At time $t_1$, the potential wells beneath the $\phi_2$ electrodes become deeper than the ones beneath the $\phi_1$ electrodes and charge moves to the left to these deeper potential wells as shown at $t_1$ in FIG. 9. The last electrode 60*a* is a special case. Referring back to FIG. 7, in response to the $\phi_2$ voltage of −15 volts at time $t_1$, a conduction channel forms beneath electrode 60*a* which extends from the potential well beneath electrode 54*a* to the charge collecting region 62*a*. As in the case of the previous embodiment, the charge collecting region is maintained relatively negative at a value such as −20 volts. Accordingly, when a −15 volt pulse is applied to electrode 60*a* the charge formerly present beneath electrode 54*a* flows to the lowest potential of the charge collecting drain region 62*a* and from the latter to the sense amplifier (not shown).

At time $t_2$ the $\phi_1$ electrodes 58, 54 are at −15 volts and the $\phi_2$ electrodes 56, 60 are at −5 volts. The potential wells therefore are deeper beneath the $\phi_1$ electrodes than the $\phi_2$ electrodes and charges move to the left to the deeper wells as shown at $t_2$ in FIG. 9.

At time $t_3$, the $\phi_1$ voltage is −5 volts and the $\phi_2$ voltage is −15 volts. Again, the potential wells beneath the $\phi_2$ electrodes become deeper than those beneath the $\phi_1$ electrodes and the charge formerly present beneath the $\phi_1$ electrodes moves to the left as shown.

In the embodiment of the invention illustrated in FIGS. 6 and 7 the asymmetry of the potential wells is enhanced by making the substrate resistivity relatively low. The resistivity, for example, may correspond to a doping level of $10^{16}$ $cm^{-3}$.

The above is a brief explanation of the use of asymmetrical potential wells in a two-phase system to effect unidirectional charge propagation. A more detailed explanation of this phenomenon employed to propagate charges in charge-coupled shift registers is given in copending application Ser. No. 106,381, filed Jan. 14, 1971 by the present inventor and assigned to the same assignee as the present application.

While not illustrated, it is to be understood that a straight two-phase light sensing array analogous to the one of FIGS. 6 and 7 may be obtained with composite electrodes spaced the same distance from the substrate. Here, the asymmetry is obtained by always maintaining one electrode such as the polysilicon electrode offset in voltage from its corresponding aluminum electrode, all is discussed in the copending application mentioned above. The polysilicon electrode may be maintained at a voltage level which is always more negative than the aluminum electrode, as one example, to provide the asymmetry illustrated in FIG. 9. Here, the substrate may be made of higher resistivity as, for example, may be achieved with a doping of $10^{14}$ $cm^{-3}$.

Figure 14:
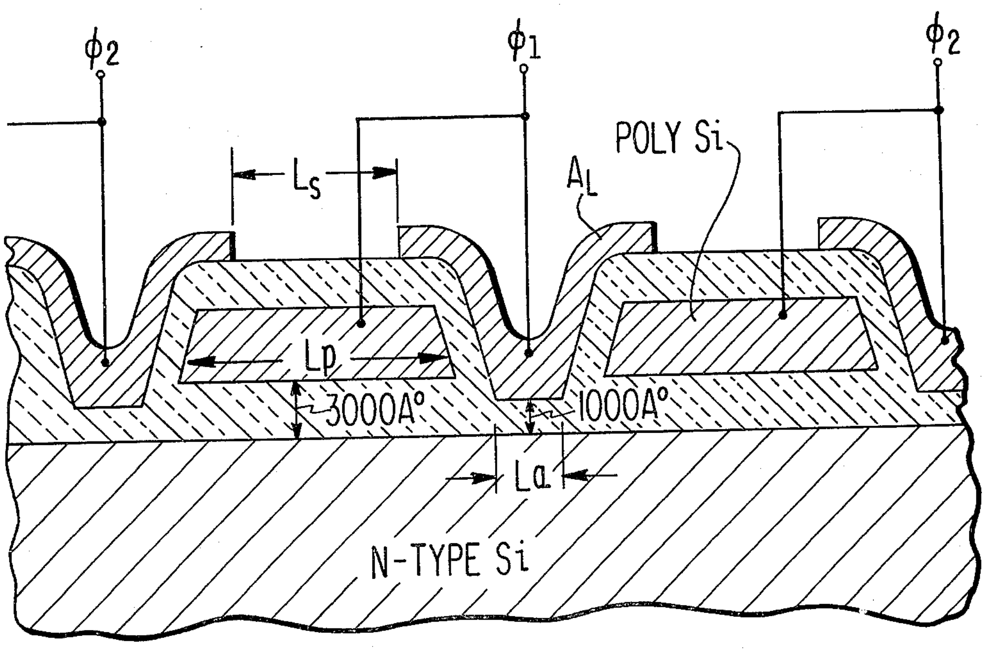
FIG. 14 is a cross-sectional view of another electrode structure that may be employed in embodiments of the invention.

There is also a third type of electrode structure illustrated in FIG. 14 which maya be employed to provide asymmetrical potential wells. Here, the aluminum electrode of the composite pair is spaced closer to the substrate than its polysilicon electrode. Typical dimensions are shown in the figure for a straight two phase operated system. With these thicknesses, the doping density of the silicon substrate may be $10^{16}$ $cm^{-3}$. This corresponds to a resistivity of about 0.5 ohm. cm. for n-type silicon. The phase voltages employed may vary in amplitude between limits such as −5 volts to −15 volts (a 10 volt swing) or −5 to −20 volts (a 15 volt swing). Of course other limits are possible for the maximum and minimum voltages. Typical widths and spacings are $L_a$ = 3 microns $L_S$ = 4 microns and $L_P$ = 8 microns.

Computer analysis indicates that the structure of FIG. 14 is capable of relatively high speed operation. The minimum transit time $T_t$ of a single charge carrier during the operation of the structure of FIG. 14 for a voltage swing of 15 volts is $T_t$ = 21 nanoseconds. This is a considerable improvement over a case in which the 3,000 A spacing is beneath the aluminum electrode and the 1,000 A spacing is beneath the polysilicon electrode, where for similar voltages, the corresponding minimum transmit time is $T_t$ = 160 nanoseconds. The result for a 10 volt voltage swing has not been calculated but it is known that here too there is a large difference in $T_t$ for the two structures.

The computer analysis above shows that with the arrangement of FIG. 14 the increased speed is a result of the speeding up of the removal of the last part of the charge remaining in a potential well. The major part of the charge transfer is largely due to the combined effect of a self-induced drift field and the fringing field. With the structure of FIG. 14, when about only 1 percent of the charge remains in a potential well, its transfer is accomplished mainly by the fringing field and transfer due to fringing field has been shown by the analysis to occur at extremely high speed.

An important feature of the light scanning arrays discussed above is the relative simplicity of the row selection arrangement. Only a single switch — a field-effect transistor transmission gate in the embodiments of the invention illustrated, is required for each row of the array. This switch disconnects one phase of the two-phase power supply when the row for that switch is non-selected, that is, when it is desired that the light induced carriers be generated and stored. While when this switch is open, the other phase of the voltage still is on, this does not adversely affect the light sensing array operation. In the embodiment of FIG. 1, in each non-selected row the light induced charges which are produced merely shuttle back and forth between a $V_O$ and a phase 1 electrode; in the embodiment of FIGS. 6 and 7, the charge remains stored beneath a phase 1 electrode even though the potential well beneath that electrode varies in depth.

In the two embodiments of the invention discussed above, any light reaching the regions of the substrate between polysilicon electrodes also leads to the generation and collection of charge carriers. These flow to the deepest potential wells present closest to the area where they are produced, namely beneath the polysilicon electrodes at the thin channel regions. The resolution is not seriously affected. In any case, each resolution element is the size of one set of electrodes, a $\phi_1$, $\phi_2$ set of electrodes for FIG. 6 and 7 and a $\phi_1$, $\phi_2$, $V_O$ set of electrodes for FIGS. 1–3. The area occupied by such a set of electrodes may be from 1–2 mils and this is about the size of one resolution element.

It might also be mentioned that another method may be employed in both arrays discussed above for applying light to the array and that is to illuminate the array from the underside of the substrate. In this case the substrate must be etched away to a relatively thin dimension such as about 1 mil (a dimension comparable to the size of the resolution element of the photosensor). Similarly, as is presently done in the case of silicon vidicons, the underside of the thinned-out wafer should also be exposed to a very thin $n+$ diffusion to improve its light detection efficiency. This approach, however, is not preferred because the thin substrate is quite fragile and must be handled very carefully to avoid damage.

Figure 10:
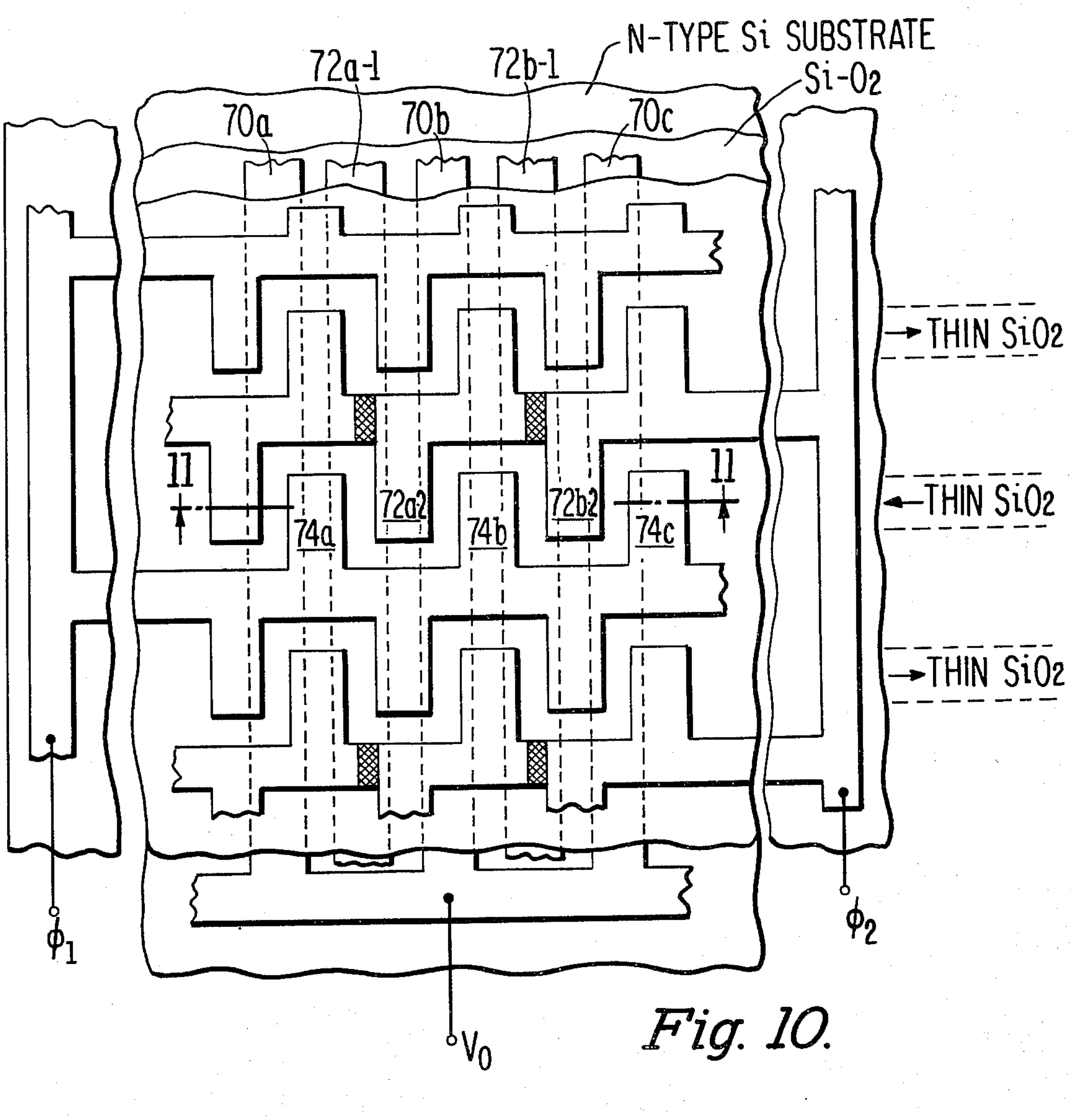
FIG. 10 is a plan view of a portion of a chargecoupled shift register array according to another embodiment of the invention.
Figure 11:
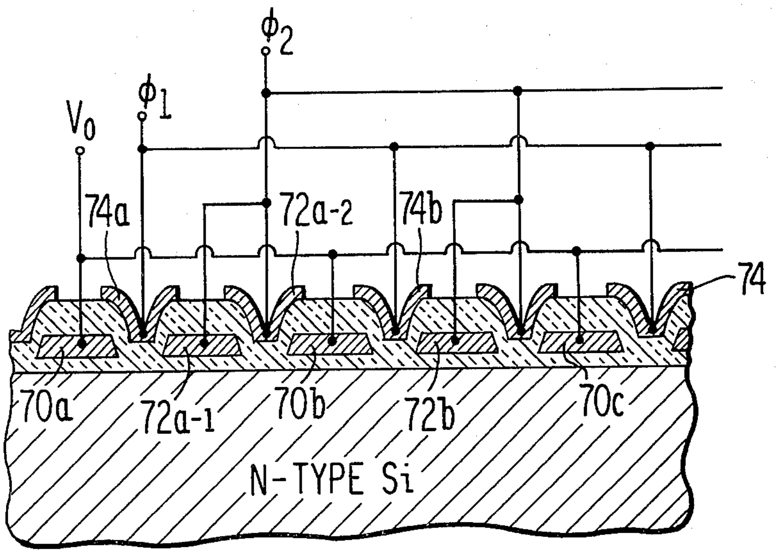
FIG. 11 is a section along line 11—11 of FIG. 10.

FIGS. 10 and 11 illustrate an embodiment of the invention suitable for use as a shift register matrix. The structure of this matrix corresponds very closely to that of the shift register shown in FIG. 17 of the copending Kosonocky application mentioned above. The principal difference is in that in the present circuit alternate polysilicon electrodes 70*a*, 70*b*, 70*c* are maintained at a fixed direct voltage level such as −10 volts. The intervening polysilicon electrodes 72*a*, 72*b* and so on are connected to the phase 2 ($\phi_2$) voltage supply.

The input and output charge supplying and charge collecting structure as well as the shift register-to-shift register coupling structures may be shown in the copending application. AS these are not of direct concern here, they are neither illustrated nor discussed.

Figure 12:
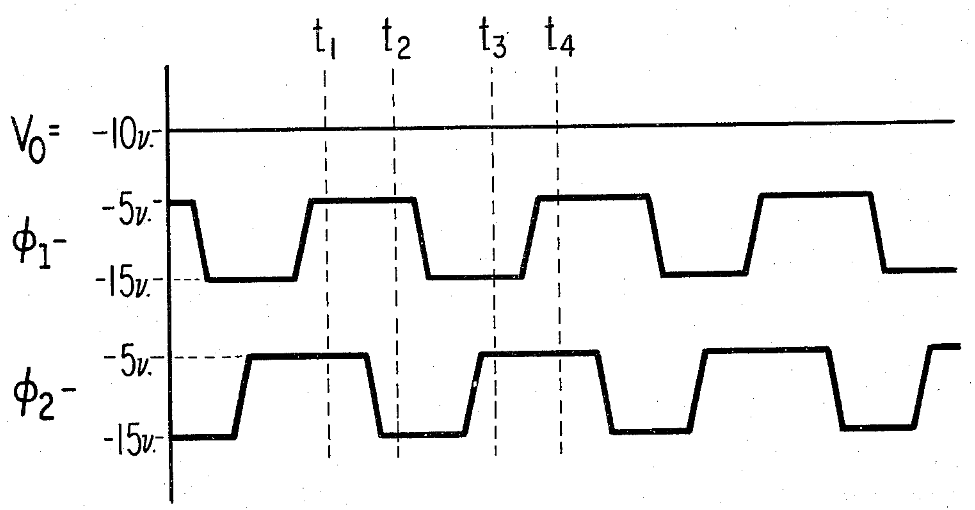
FIG. 12 is a drawing of waveforms employed to operate the circuit of FIGS. 10 and 11.
Figure 13:
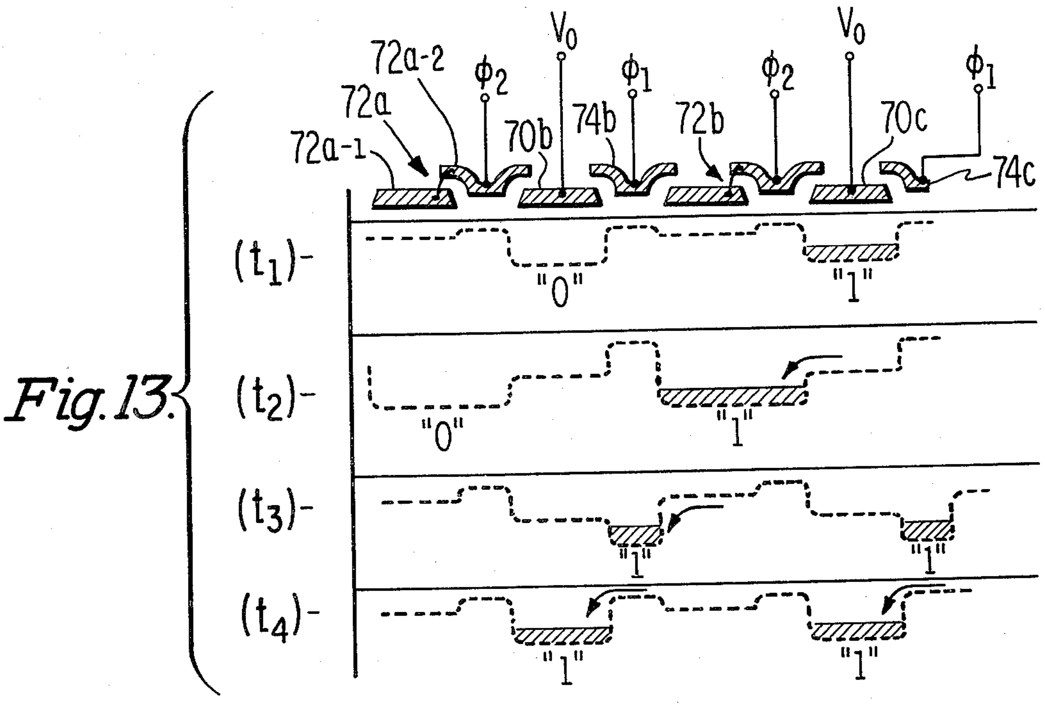
FIG. 13 is a drawing of potential wells produced in response to the waves of FIG. 12.

FIG. 12 illustrates the waveforms which may be employed in the operation of the shift register system and FIG. 13 shows the potential wells. Assume that charge has been introduced into the system in the manner discussed in the copending application and that "charges" are stored beneath the polysilicon electrodes 70*b* and 70*c*. As illustrated, positive charges, indicative of the binary digit (bit) 1, are present beneath electrode 70*c* and there is an absence of charge indicative of the bit, 0, beneath electrode 70*b*. At time $t_1$, the phase 1 voltage is at −5 volts so that the potential wells formed beneath aluminum electrodes 74*b* and 74*c* are relatively shallow. The composite electrodes 72*a* and 72*b* also are at −5 volts so that the potential wells beneath these electrodes are relatively shallow. An aluminum electrode such as 72*a*-2 may be slightly further from the substrate than its paired polysilicon electrode 72*a*-1 and in this case the potential well beneath the aluminum electrode is somewhat shallower than that beneath the polysilicon electrode. (Alternative electrode configurations, for example, the $\phi_1$ electrode the same spacing as the $\phi_2$ electrode from the substrate, are also possible.)

At time $t_2$, the $\phi_1$ voltage is still −5 volts whereas the $\phi_2$ voltage has changed to −15 volts. Now the potential well beneath the composite electrodes 72*a* and 72*b* are deeper than the potential wells beneath any of the remaining electrodes. Accordingly, the charge formerly present beneath polysilicon electrode 70*c* flows into the well beneath composite electrode 72*b*. Similarly, the absence of charge at electrode 70*b* now appears still as an absence of charge in the deeper well beneath composite electrode 72*a*.

At time $t_3$ the $\phi_2$ voltage has returned to −5 volts and the $\phi_1$ voltage is at −15 volts. This means that the deepest potential wells appear beneath aluminum electrodes 74. The charge formerly present under composite electrode 72*b* now flows to the left to the region beneath electrode 74*b*. Similarly, the absence of charge at 72*a* flows to the left to the relatively deeper potential well beneath electrode 74*a* (not shown in FIG. 13).

At time $t_4$, both $\phi_1$ and $\phi_2$ are at −5 volts which is more positive than the −10 volt dc level at which the polysilicon electrodes 70 are maintained. Accordingly, the deepest potential wells are now beneath electrodes 70 and the charge formerly present beneath aluminum electrode 74*b* flows to the left to the potential well beneath electrode 70*b*. Similarly, all other charges, or absence of charges, flow to the left.

While the embodiment of the invention illustrated in FIGS. 10 and 11 has been described in terms of a shift register, it is to be understood that it is also useful in other applications. For example, this embodiment may be employed as a self-scanned photosensor array. In this application, if desired, the polysilicon electrodes may be made somewhat wider and the edges of adjacent interleaving aluminum electrodes spaced somewhat further apart to provide larger windows for light to reach the substrate.

A number of materials of which charge-coupled systems may be made are mentioned by way of example in this application and the methods of construction of the charge-coupled systems are not discussed at all. Other examples of suitable materials and a discussion of how the systems may be manufactured appears in the copending Kosonocky application identified above.

What is claimed is:

1. In a two-phase charge coupled circuit, in combination:

a semiconductor substrate;

a row of charge storage electrodes capacitively coupled to said substrate, said row comprising successive groups, each with three electrodes, the third electrode of each group lying between the second electrode of that group and the first electrode of the next group;

means for continuously maintaining the second electrode of each group at a direct voltage level $V_1$ sufficient to permit a minority charge to accumulate in the substrate beneath each second electrode;

means for applying to each first electrode of each group a $\phi_1$ voltage which varies in value from $V_O$ to $V_2$, where $V_O < v_1$ and $V_2 > V_1$, and where $\phi_1$ is one phase of a two-phase voltage; and means for applying to each third electrode of each group a $\phi_2$ voltage which varies in value from $V_{00}$ to $V_{02}$ and which is out-of-phase with the $\phi_1$ voltage, where $V_{00} < V_1$ and $V_{02} > V_1$, and where $\phi_2$ is the other phase of said two-phase voltage.

2. In a charge-coupled circuit as set forth in claim 1, further including means for interrupting said $\phi_2$ voltage and applying instead to said third electrodes a direct voltage less than $V_1$, whereby any charge present at a first electrode shuttles back and forth between that first electrode and the adjacent second electrode.

3. In a charge-coupled circuit as set forth in claim 1, further including means for photo-exciting said second electrodes for causing charge to accumulate under said second electrodes.

4. In a charge-coupled circuit as set forth in claim 3, said second electrodes comprising relatively thin polysilicon electrodes covered by a relatively thin, transparent insulating layer and said first and third electrodes each comprising metal electrodes individually capacitively coupled to a polysilicon electrode and to the substrate and said photo-excitation being applied through said polysilicon electrodes to said substrate.

5. In a two-phase operated, charge-coupled circuit, in combination:

a substrate formed of semiconductor material at which charges may be stored;

a plurality of electrode means adjacent to one another forming a row along which charges are to propagate, each such means comprising a pair of electrodes, one electrode formed of a semiconductor and spaced at least twice as far from the substrate as the other electrode of said pair, said other electrode comprising a metal which is spaced of the order of 1,000 A or less from the substrate and which overlaps the semiconductor electrode of the same pair and the semiconductor electrode of the next adjacent electrode means, said semiconductor electrode having a substantially larger area facing the substrate than the portion of the metal electrode closest to the substrate, each semiconductor electrode being directly connected to its paired metal electrode; and means for applying one phase of a two-phase shift voltage to alternate electrode means and the second phase of the two-phase shift voltage to the other electrode means.

6. In a two-phase operated, charge-coupled circuit as set forth in claim 5, each electrode means comprising a polysilicon electrode as the semiconductor electrode and an aluminum electrode as the metal electrode.

7. A charge-coupled radiant energy sensing system comprising, in combination:

a semiconductor substrate;

an insulating layer on said substrate;

an array of radiant-energy sensing locations on said insulating layer, each location comprising a relatively transparent polysilicon electrode, a metal electrode spaced from and slightly overlapping an edge of the polysilicon electrode, and a second metal electrode, spaced from and slightly overlapping the opposite edge of the polysilicon electrode, these two metal electrodes leaving a portion of one surface of the polysilicon electrode available for the reception of a radiant energy image;

means for applying a radiant energy image to the surface of said array closest to said one surface of said polysilicon electrodes for passage through said polysilicon electrodes to said substrate means for applying a continuous, direct voltage level to said polysilicon electrode, at least during the time said radiant energy image is being applied to said array; and means for shifting charge signals accumulated in said array comprising means applying multiple phase voltages to said metal electrodes while maintaining said polysilicon electrodes at said continuous, direct voltage level.

8. A charge-coupled sensing system as set forth in claim 7, wherein the first metal electrode of each location in a row except the first such location is formed as an extension of the second metal electrode of the preceding location in that row.

9. A charge-coupled light sensing array comprising in combination:

a common semiconductor substrate;

an array of charge storage electrodes arranged in columns and rows capacitively coupled to said substrate, each third one of said electrodes being responsive to light for accumulating a charge at the surface of the substrate beneath that electrode;

a sense amplifier coupled to an end of all rows in the array;

a two phase power supply;

means for selecting any desired row for readout comprising means for coupling both phases of said two phase power supply to electrodes in said selected row for shifting the charge present in the selected row to the end of that row for sensing by said sense amplifier;

means for continuously applying to all rows not selected only one of said phases of said two phase power for retaining charges accumulated in the non-selected rows stored in these rows;

each row of the array comprising successive groups of electrodes, each such group with three electrodes, the third electrode of each group lying between the second electrode of that group and the first electrode of the next group; and said means for selecting any desired row comprising means for maintaining the second electrode of each group, that is, the electrode responsive to light, at a direct voltage level $V_1$, means for applying the first phase $\phi_1$ of said two phase power supply to the first electrode of each group, said first phase varying in value from $V_0$ to $V_2$, where $V_0 < V_1$ and $V_2 > V_1$, and means for applying the second phase $\phi_2$ of said two phase power supply to the third electrode of each group, said second phase varying in value from $V_0$ to $V_2$ and being out-of-phase with $\phi_1$.

10. A charge-coupled radiation sensing array comprising, in combination:

first and second connections for the first and second phases, respectively, of a two phase power supply;

a third connection, this one for a direct voltage power supply;

a substrate;

an array of charge storage electrodes arranged in columns and rows capacitively coupled to said substrate, each row of the array comprising a plurality of locations equal to the number of columns, each location having first, second and third electrodes, and each row including an output terminal at the end of that row;

fixed connections from said third connection to all second electrodes of said array, for maintaining said second electrodes at a voltage level to permit the accumulation of radiation induced charge in the regions of said substrate adjacent to said second electrodes;

fixed connections from said first connection to all first electrodes in said array; and means for selecting any desired row for readout comprising means for coupling said second connection to the third electrode of each location in the desired said row for shifting the charge signal accumulated at each location in said desired row from location to location in that row until it reaches the output terminal at the end of that row.

* * * * *